(12) United States Patent
Rossi et al.

(10) Patent No.: US 11,318,840 B2
(45) Date of Patent: May 3, 2022

(54) VEHICLE TRAVEL CONTROL METHOD AND VEHICLE TRAVEL CONTROL DEVICE

(71) Applicant: Nissan Motor Co., Ltd., Yokohama (JP)

(72) Inventors: Sergio Rossi, Kanagawa (JP); Takao Ando, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/203,899

(22) Filed: Mar. 17, 2021

(65) Prior Publication Data
US 2021/0291652 A1 Sep. 23, 2021

(30) Foreign Application Priority Data
Mar. 18, 2020 (JP) .............................. JP2020-048049

(51) Int. Cl.
| | | |
|---|---|---|
| *F16H 61/16* | (2006.01) | |
| *B60K 31/02* | (2006.01) | |
| *B60K 31/16* | (2006.01) | |
| *B60W 10/10* | (2012.01) | |

(52) U.S. Cl.
CPC .............. *B60K 31/02* (2013.01); *B60K 31/16* (2013.01); *F16H 61/16* (2013.01); *B60K 2310/20* (2013.01); *B60W 10/10* (2013.01); *B60W 2510/104* (2013.01); *B60W 2520/10* (2013.01); *B60W 2520/105* (2013.01); *B60W 2552/15* (2020.02); *B60W 2710/1005* (2013.01); *B60W 2720/10* (2013.01); *F16H 2061/163* (2013.01); *F16H 2710/04* (2013.01)

(58) Field of Classification Search
CPC ....... B60W 2520/105; B60W 2720/10; B60W 10/10; B60W 2510/104; B60W 2520/10; B60W 2710/1005; B60W 2510/1005; B60W 2540/10; F16H 61/16; F16H 2061/163; F16H 2710/04
USPC ....................................................... 701/93–95
See application file for complete search history.

(56) References Cited

U.S. PATENT DOCUMENTS

| | | | | |
|---|---|---|---|---|
| 2002/0006850 | A1* | 1/2002 | Takao | ...................... F16H 61/16 477/118 |
| 2008/0306669 | A1* | 12/2008 | Wang | ...................... B60K 31/00 701/93 |
| 2011/0190992 | A1* | 8/2011 | Klei | ........................ F16H 61/21 701/58 |

FOREIGN PATENT DOCUMENTS

| | | |
|---|---|---|
| JP | 2003-200750 A | 7/2003 |
| JP | 2004-138143 A | 5/2004 |

\* cited by examiner

*Primary Examiner* — Roger L Pang
(74) *Attorney, Agent, or Firm* — Global IP Counselors, LLP

(57) ABSTRACT

A vehicle travel control method and a vehicle travel control device carries out a downshift control of an automatic transmission when a vehicle speed increases from a set vehicle speed during a constant speed travel control by at least a first prescribed value. Subsequent downshift control of the automatic transmission is prohibited upon determining the vehicle speed has increased from the set vehicle speed by at least the first prescribed value due to an operation of an operating element by the driver during constant speed travel control. Downshift control of the automatic transmission is executed upon determining insufficient deceleration of the vehicle exists where the driver is not operating the accelerator pedal during prohibition of the downshift control.

4 Claims, 5 Drawing Sheets

VEHICLE TRAVEL CONTROL METHOD AND VEHICLE TRAVEL CONTROL DEVICE

CROSS-REFERENCE TO RELATED APPLICATIONS

This application claims priority to Japanese Patent Application No. 2020-048049, filed on Mar. 18, 2020. The entire disclosure of Japanese Patent Application No. 2020-048049 is hereby incorporated herein by reference.

BACKGROUND

Technical Field

The present invention generally relates to a vehicle travel control method and a vehicle travel control device.

Background Information

Japanese Laid-Open Patent Application No. 2004-138143 discloses a vehicle equipped with a constant speed travel control system that prohibits downshift control when the driver depresses the accelerator pedal during constant speed travel control, and the actual vehicle speed exceeds a set vehicle speed by a prescribed permitted value.

Japanese Laid-Open Patent Application No. 2003-200750 discloses a vehicle equipped with a constant speed travel control system that prohibits shift control (downshifting or upshifting) for a prescribed period of time, when the set vehicle speed of the constant speed travel control is changed to the low vehicle speed side by the driver.

SUMMARY

In Japanese Patent Publications described above, when downshift control is prohibited during constant speed travel control, if the vehicle is traveling on a downhill road and the vehicle speed increases, there is the risk of the vehicle speed deviating from the set vehicle speed of the constant speed travel control, which may thereby make the driver uncomfortable.

The transmission control method and the transmission control device according to the present disclosure comprise prohibiting subsequent downshift control of the automatic transmission when the vehicle speed increases from the set vehicle speed by the first prescribed value or more by a driver's operation of an operating element during constant speed travel control, and executing downshift control of the automatic transmission if insufficient deceleration of the vehicle is detected, when the driver is not operating the accelerator pedal during prohibition of downshift control.

Thus, it is possible to suppress the vehicle speed from deviating from the set vehicle speed of the constant speed travel control, even when the vehicle travels on a downhill road and the vehicle speed increases, when downshift control is prohibited during constant speed travel control, so as not to create discomfort for the driver.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the vehicle control field from this disclosure that the following descriptions of the embodiments are provided for illustration only and not for the purpose of limiting the invention as defined by the appended claims and their equivalents.

First Embodiment

Figure 1:
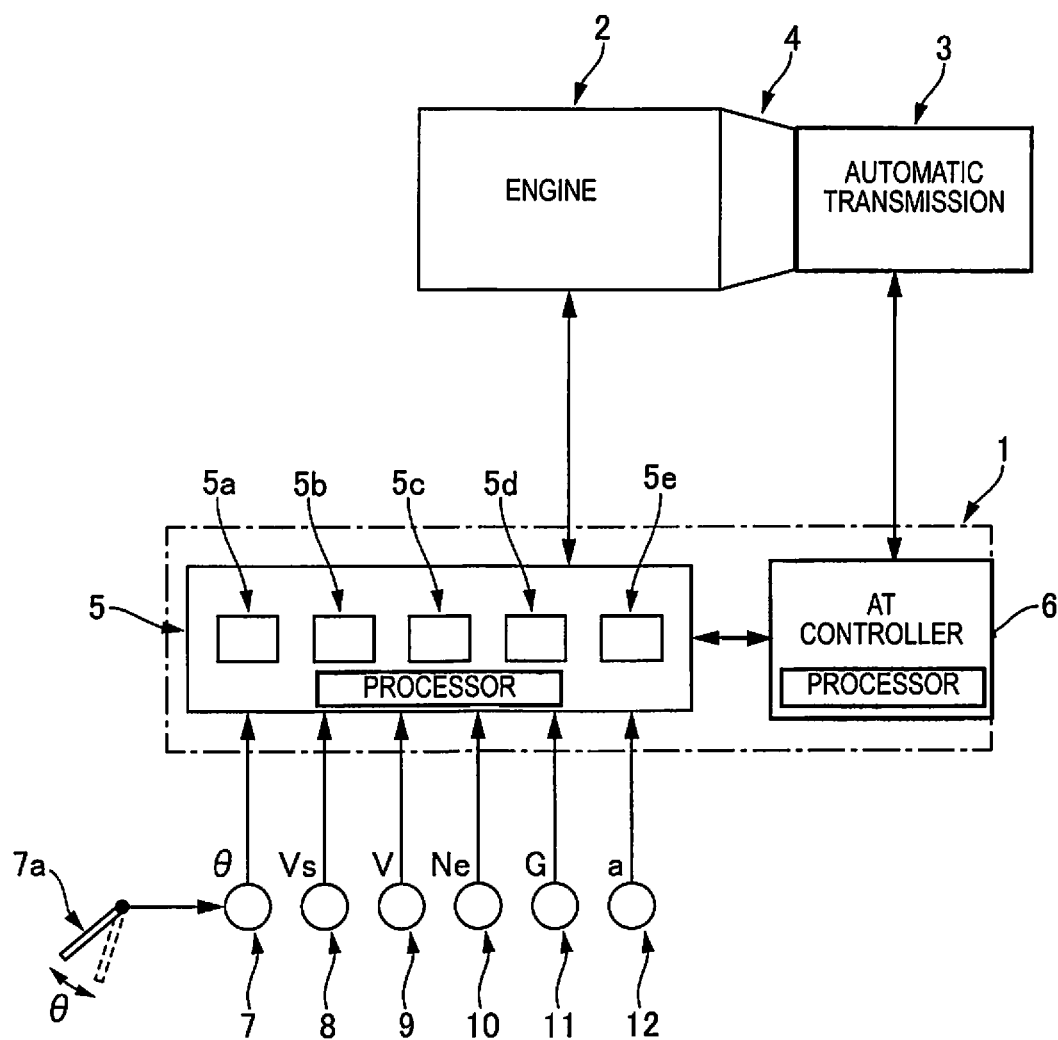
FIG. 1 is a schematic diagram illustrating the overall system of a vehicle travel control device according to a first embodiment.

FIG. 1 is a schematic diagram illustrating the overall system of a vehicle travel control device according to a first embodiment. The overall view of the first embodiment will be described based on FIG. 1. A vehicle travel control device 1 comprises an automatic transmission controller 6 that controls the amount of fuel supplied so as to produce the desired air-fuel ratio with respect to the amount of intake air to an injector (not shown) and an electronically controlled throttle valve (not shown) for controlling the amount of intake air supplied to an engine 2, in accordance with information from an accelerator pedal sensor 7 that detects the operation amount θ of an accelerator pedal (operating element) 7a that is interlocked with the not-shown electronically controlled throttle valve for controlling the amount of intake air supplied to the engine 2, a vehicle speed sensor 9 that detects the vehicle speed V, and an engine rotation speed sensor 10 that detects the rotation speed Ne of the engine 2, and the like, and that controls the gear shift stage of an automatic transmission 3 that is connected to the engine 2 via a torque converter 4, in accordance with information from the operation amount θ from the accelerator pedal sensor 7 and an engine controller 5 that controls the engine 2, and the vehicle speed V from the vehicle speed sensor 9, and the like. The term "sensor" as used herein also refers to a hardware device or instrument designed to detect the presence of a particular object or substance and to emit a signal in response. The term "sensor" as used herein also do not include a human.

The engine controller 5 includes a normal-use engine control unit 5a, a constant speed travel control unit 5b, a downshift control unit 5c, a downshift prohibition control unit 5d, and a re-downshift control unit 5e. The normal-use engine control unit 5a is configured to control the engine 2 in the normal use state. The constant speed travel control unit 5b is configured to carry out constant speed travel control such that the vehicle speed V maintains a set vehicle speed Vs, which is set by the driver's operation of a constant speed travel control switch (operating element) 8 for setting the set vehicle speed Vs as well as for starting/canceling the constant speed travel. The downshift control unit 5c is configured to instruct the automatic transmission controller 6 to execute downshift control, when the vehicle speed V exceeds the set vehicle speed Vs of the constant speed travel by a first prescribed value V1 or more according to information from the vehicle speed sensor 9 during the constant speed travel control of the constant speed travel control unit 5b. The downshift prohibition control unit 5d is configured to prohibit a subsequent downshifting control if the driver has operated the accelerator pedal 7a according to information on the operation amount θ of the accelerator pedal 7a from the accelerator pedal sensor 7, and the vehicle speed V has exceeded the set vehicle speed Vs of the constant speed travel by the first prescribed value V1 or more according to information from the vehicle speed sensor 9, during the constant speed travel control of the constant speed travel control unit 5b. The re-downshift control unit 5e is configured to instruct the automatic transmission controller 6 to execute downshift control when insufficient deceleration of the vehicle is detected according to such information as the vehicle speed V from the vehicle speed sensor 9, the acceleration G of the vehicle from the acceleration sensor 10, the road gradient α from a gradient sensor 12, etc., when the driver is not operating the accelerator pedal according to information regarding the operation amount θ of the accelerator pedal 7a from the accelerator pedal sensor 7, during prohibition of downshift control by the downshift prohibition control unit 5d.

The engine controller 5 and the automatic transmission controller 6 are examples of electronic controllers that include at least one processor for executing control programs stored in memory. The term "electronic controller" as used herein refers to hardware that executes a software program, and does not include a human. While the engine controller 5 and the automatic transmission controller 6 are illustrated in FIG. 1 as separate components, it will be apparent from this disclosure that the engine controller 5 and the automatic transmission controller 6 can be combined into a single component that includes one or more processors.

Details regarding the detection of the insufficient deceleration of the vehicle will be described further below. Information such as the vehicle speed V from the vehicle speed sensor 9 and the operation amount θ of the accelerator pedal 7a from the accelerator pedal sensor 7 is transmitted from the engine controller 5 to the automatic transmission controller 6.

Figure 2:
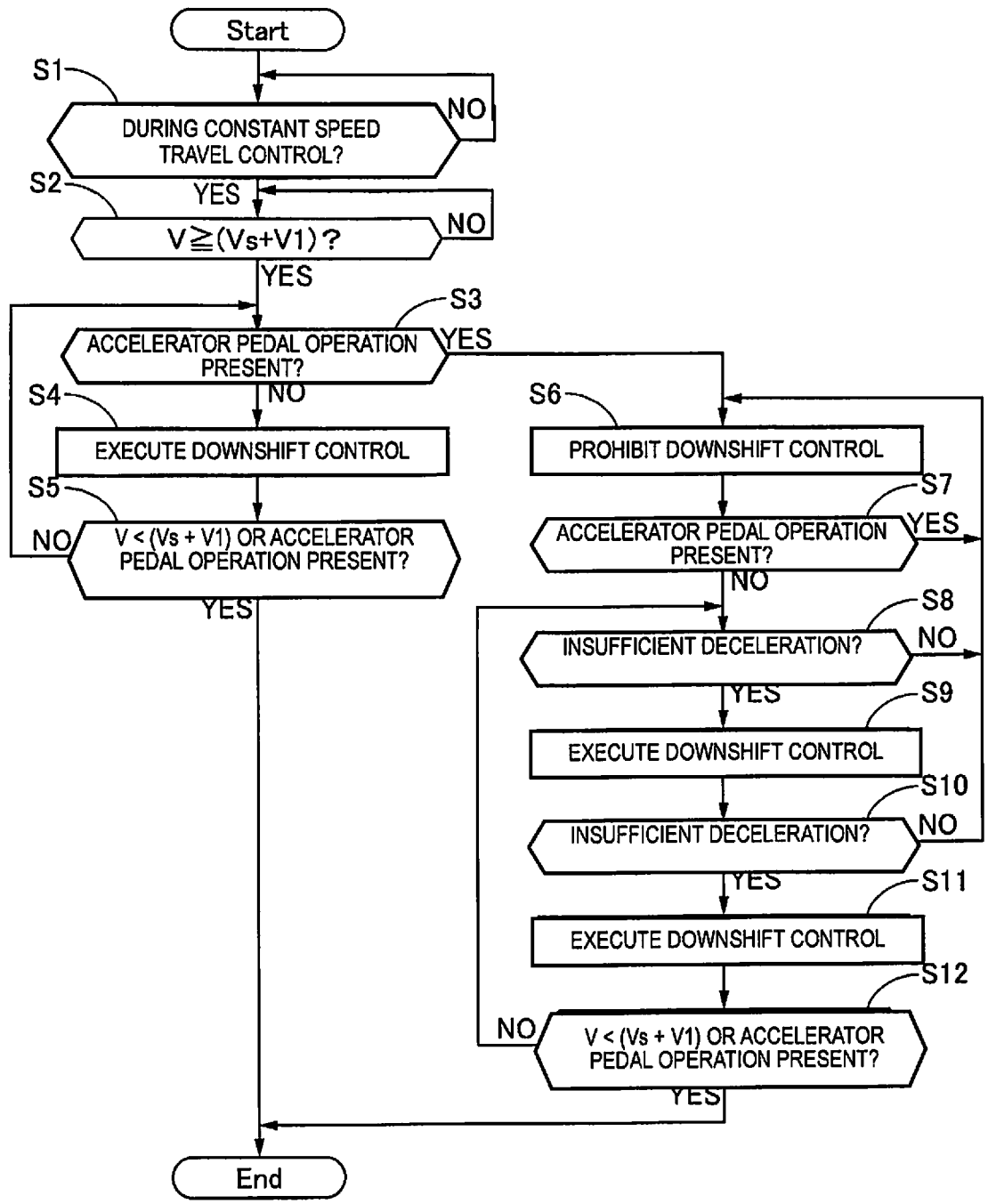
FIG. 2 is a flowchart illustrating the flow of a control process of the vehicle travel control device according to the first embodiment.

FIG. 2 is a flowchart illustrating the flow of a control process of the vehicle travel control device according to the first embodiment. This process flow is repeatedly executed at a prescribed calculation cycle.

In Step S1, it is determined whether the constant speed travel control unit 5b is executing constant speed control. When the constant speed travel control unit 5b is executing constant speed control, the process proceeds to Step S2, and if the constant speed travel control unit 5b is not executing constant speed control, the process returns to Step S1.

In Step S2, it is determined whether the vehicle speed V has exceeded the set vehicle speed Vs by the first prescribed value V1 or more, according to information from the vehicle speed sensor 9. If the vehicle speed V has exceeded the set vehicle speed Vs of the constant speed travel by the first prescribed value V1 or more, the process proceeds to Step S3, and if the vehicle speed V has not exceeded the set vehicle speed Vs of the constant speed travel by the first prescribed value V1 or more, the process returns to Step S2.

In Step S3, it is determined whether the driver is operating the accelerator pedal 7a according to information regarding the operation amount θ of the accelerator pedal 7a from the accelerator pedal sensor 7. If the driver is operating the accelerator pedal 7a, the process proceeds to Step S6, and if the driver is not operating the accelerator pedal 7a, the process proceeds to Step S4.

In Step S4, the downshift control unit 5c instructs the automatic transmission controller 6 to execute a one-step downshift.

In Step S5, it is determined whether the vehicle speed V is not exceeding the set vehicle speed Vs by the first prescribed value V1 or more, that is, whether the vehicle speed V has converged to the set vehicle speed Vs, or whether the driver is operating the accelerator pedal 7a according to information from the accelerator pedal sensor 7. If the vehicle speed V has converged to the set vehicle speed Vs, or if the driver is operating the accelerator pedal according to information from the accelerator pedal sensor 7, control is ended; and if the vehicle speed V has not converged to the set vehicle speed Vs, and the driver is not operating the accelerator pedal according to information from the accelerator pedal sensor 7, the process returns to Step S3.

In Step S6, the downshift prohibition control unit 5d determines that the driver is operating the accelerator pedal according to information regarding the operation amount θ of the accelerator pedal 7a from the accelerator pedal sensor 7 while the constant speed travel control unit 5b is controlling constant speed travel, and that the vehicle speed V has exceeded the set vehicle speed Vs of the constant speed travel by the first prescribed value V1 or more according to information from the vehicle speed sensor 9, and instructs the automatic transmission controller 6 to prohibit subsequent down shift control.

In Step S7, it is determined whether the driver is operating the accelerator pedal 7a according to information on the operation amount θ of the accelerator pedal 7a from the accelerator pedal sensor 7. If the driver is operating the accelerator pedal 7a, the process returns to Step S6, and if the driver is not operating the accelerator pedal 7a, the process proceeds to Step S8.

In Step S8, it is determined whether the deceleration of the vehicle is insufficient. If the deceleration of the vehicle is insufficient, the process proceeds to Step S9, and if the deceleration of the vehicle is not insufficient, the process returns to Step S6.

In Step S9, the re-downshift control unit 5e instructs the automatic transmission controller 6 to execute one-step downshift control.

In Step S10, it is determined whether the deceleration of the vehicle is insufficient. If the deceleration of the vehicle is insufficient, the process proceeds to Step S11, and if the deceleration of the vehicle is not insufficient, the process returns to Step S6.

In Step S11, the re-downshift control unit 5e instructs the automatic transmission controller 6 to execute one-step downshift control.

In Step S12, it is determined whether the vehicle speed V is not exceeding the set vehicle speed Vs by the first prescribed value V1 or more, that is, whether the vehicle speed V has converged to the set vehicle speed Vs, or whether the driver is operating the accelerator pedal 7a according to information regarding the operation amount θ of the accelerator pedal 7a from the accelerator pedal sensor 7.

If the vehicle speed V has converged to the set vehicle speed Vs, or if the driver is operating the accelerator pedal 7a according to information on the operation amount θ of the accelerator pedal 7a from the accelerator pedal sensor 7, control is ended, and if the vehicle speed V has not converged to the set vehicle speed Vs, and the driver is not operating the accelerator pedal 7a according to information on the operation amount θ of the accelerator pedal 7a from the accelerator pedal sensor 7, the process returns to Step S8.

Figure 3:
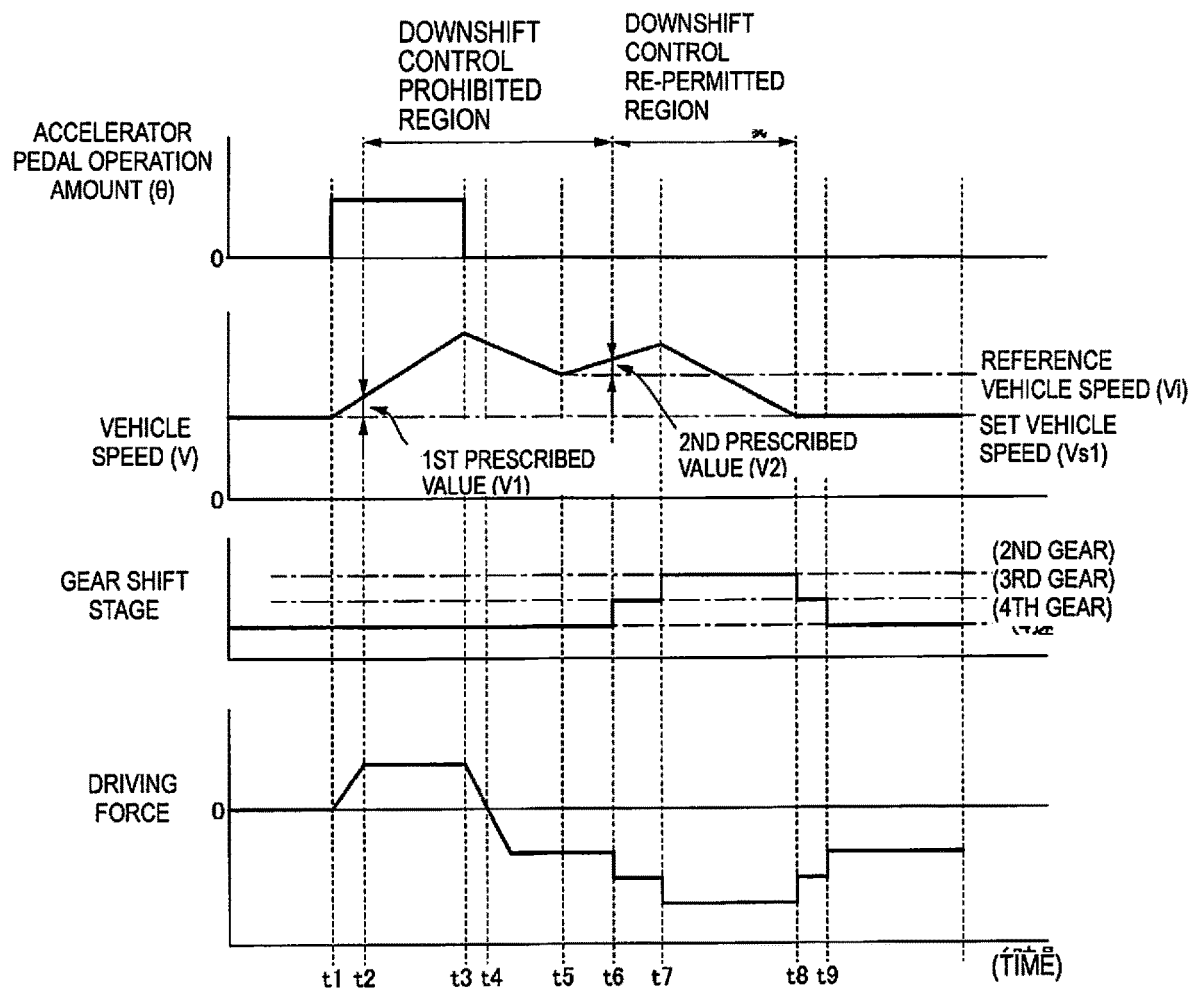
FIG. 3 is a timing chart illustrating one example of the vehicle travel control device according to the first embodiment during execution of the control process.

FIG. 3 is a timing chart illustrating one example of the first embodiment during execution of the control process. The horizontal axis represents time, the top shows changes in the operation amount θ of the accelerator pedal 7a, followed below by changes in the vehicle speed V, in the gear shift stage of the automatic transmission 3, and in the driving force of the engine 2.

Until time t1, the vehicle is traveling at the set vehicle speed Vs by means of constant speed travel control of the constant speed travel control unit 5b.

At time t1, the driver operates the accelerator pedal 7a, the engine 2 begins to generate a positive driving force, and the vehicle speed V begins to increase. At this time, the gear shift stage of the automatic transmission 3 is fourth gear.

At time t2, since the driver is operating the accelerator pedal 7a and the vehicle speed V has exceeded the set vehicle speed Vs by the first prescribed value V1 or more, the downshift prohibition control unit 5d prohibits subsequent downshift control.

At time t3, the driver has ended the operation of the accelerator pedal 7a. At this time, the vehicle speed V and the driving force generated by the engine 2 start to decrease.

At time t4, the engine 2 begins to generate a negative driving force. That is, the state is such that not-shown drive wheels are driving the engine 2 via the automatic transmission 3 and the torque converter 4.

At time t5, the vehicle switches from a decelerating state to an accelerating state. That is, the vehicle starts to travel on a downhill road. The lowest vehicle speed V at this time t5 is stored as a reference vehicle speed Vi.

At time t6, the vehicle speed V exceeds the reference vehicle speed Vi by the second prescribed value V2. The first prescribed value V1 and the second prescribed value V2 can be different values or the same value. In this manner, when vehicle speed V exceeds the reference vehicle speed Vi, i.e., the lowest vehicle speed subsequent to the termination of the driver's operation of the accelerator pedal 7a, by the second prescribed value V2 or more, it is determined that the deceleration of the vehicle is insufficient.

Detection of the insufficient deceleration of the vehicle may be carried out when the acceleration G of the vehicle as sensed by the acceleration sensor 10 exceeds a prescribed acceleration Go, or when the downhill gradient α sensed by the gradient sensor 12, or the currently traveled downhill gradient α stored in a navigation device, not shown, exceeds a prescribed downhill gradient αo.

If insufficient deceleration of the vehicle is detected when the driver is not operating the accelerator pedal 7a, the re-downshift control unit 5e instructs the automatic transmission controller 6 to execute a one-step down shift control (fourth gear third gear).

At time t7, insufficient deceleration of the vehicle is still detected when the driver is not operating the accelerator pedal 7a, so that the re-downshift control unit 5e instructs the automatic transmission controller 6 to execute another one-step down shift control (third gear⇒second gear).

As a result, the vehicle speed V begins to decrease toward the set vehicle speed Vs.

At time t8, since the vehicle speed V has converged to the set vehicle speed Vs, the constant speed travel control unit 5b starts the normal constant speed travel control with respect to the set vehicle speed Vs, and instructs the automatic transmission 6 to execute a one-step upshift (second gear⇒third gear).

At time t9, since the vehicle speed V has converged to the set vehicle speed Vs, the constant speed travel control unit 5b starts the normal constant speed travel control with respect to the set vehicle speed Vs, and instructs the automatic transmission 6 to execute another one-step upshift (second gear⇒third gear). As a result, constant speed travel control is restored before time t1. That is, the time from time t2 to t6 is the downshift control prohibited region, and the time from time t6 to t8 is the downshift control re-permitted region.

In this manner, when the vehicle speed V exceeds the set vehicle speed Vs by the first prescribed value V1 or more during constant speed travel control, the automatic transmission controller 6 is downshifted, but when the driver operates the accelerator pedal 7a during the constant speed travel control and the vehicle speed V exceeds the set vehicle speed Vs by the first prescribed value V1 or more, the downshift control of the automatic transmission controller 6 is prohibited, and, during the prohibition of the downshift control, when the vehicle speed V exceeds the reference vehicle speed Vi, i.e., the lowest vehicle speed subsequent to the termination of the driver's operation of the accelerator pedal 7a, by the second prescribed value V2 or more while the driver is not operating the accelerator pedal 7a, or when the acceleration G of the vehicle from the acceleration sensor 10 exceeds the prescribed acceleration Go, or when the downhill gradient α from the gradient sensor 12 or the currently traveled downhill gradient α stored in a not-shown navigation device exceeds the prescribed downhill gradient αo, insufficient deceleration of the vehicle is detected, and downshift control is again permitted, so that it is possible to improve the ability of the constant speed travel control to control the vehicle speed to the set vehicle speed Vs, so that discomfort to the driver can be avoided.

The action and effects will now be described. The effects listed below can be exhibited by the vehicle travel control method and vehicle travel control device according to the first embodiment.

(1) When the vehicle speed V exceeds the set vehicle speed Vs by the first prescribed value V1 or more during constant speed travel control, the automatic transmission controller 6 is downshifted, but when the driver operates the accelerator pedal 7a during the constant speed travel control and the vehicle speed V exceeds the set vehicle speed Vs by the first prescribed value V1 or more, downshift control of the automatic transmission controller 6 is prohibited, and, during the prohibition of the downshift control, when the vehicle speed V exceeds the reference vehicle speed Vi, i.e., the lowest vehicle speed subsequent to the termination of the driver's operation of the accelerator pedal 7a, by the second prescribed value V2 or more while the driver is not operating the accelerator pedal 7a, or when the acceleration G of the vehicle from the acceleration sensor 10 exceeds the prescribed acceleration Go, or when the downhill gradient α from the gradient sensor 12 or the currently traveled downhill gradient α stored in a not-shown navigation device exceeds the prescribed downhill gradient αo, insufficient deceleration of the vehicle is detected and the downshift control is again permitted.

Thus, it is possible to improve the ability of the constant speed travel control to control the vehicle speed to the set vehicle speed Vs, so that discomfort to the driver can be avoided.

Second Embodiment

Figure 4:
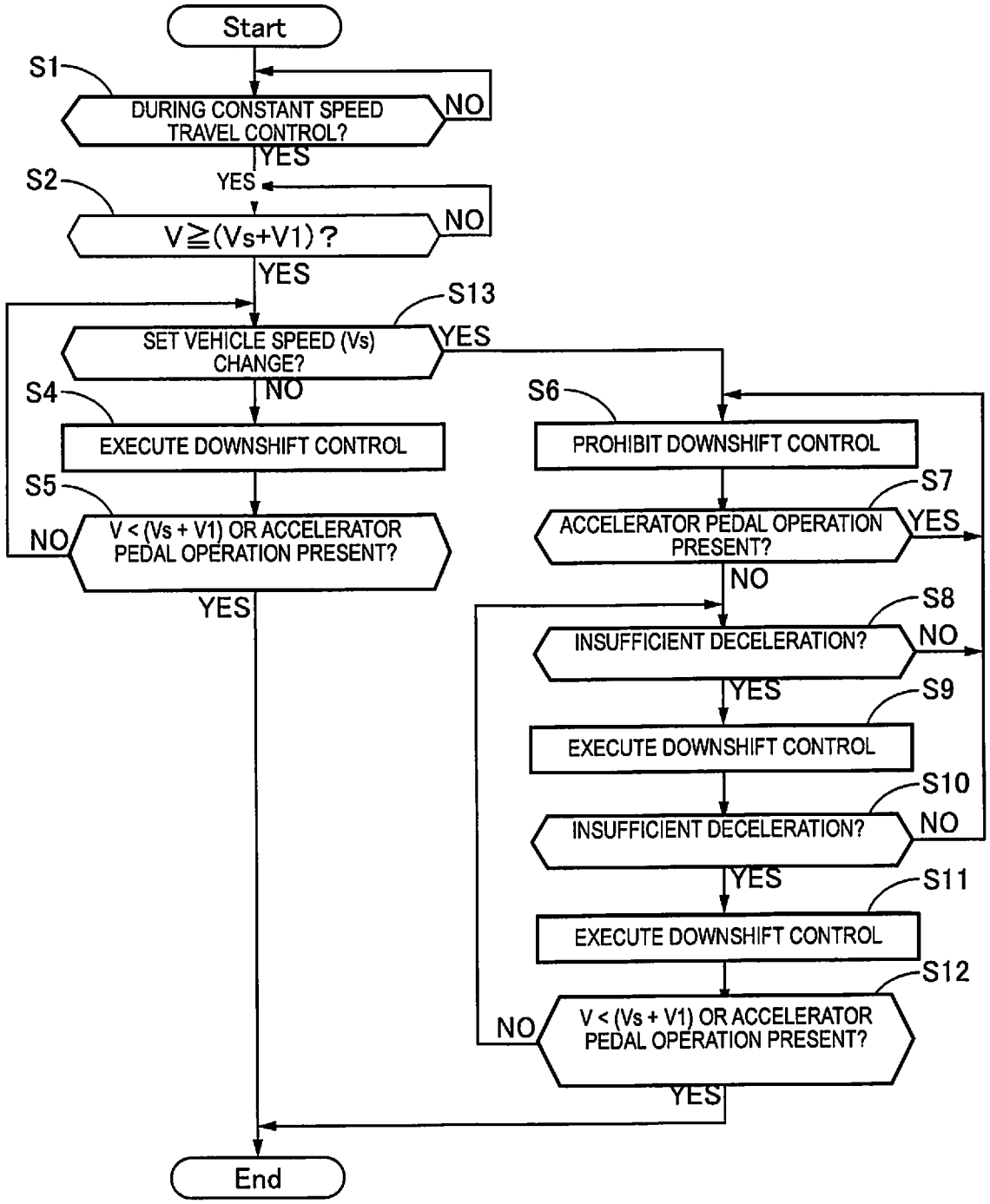
FIG. 4 is a flowchart illustrating the flow of a control process of the vehicle travel control device according to a second embodiment.
Figure 5:
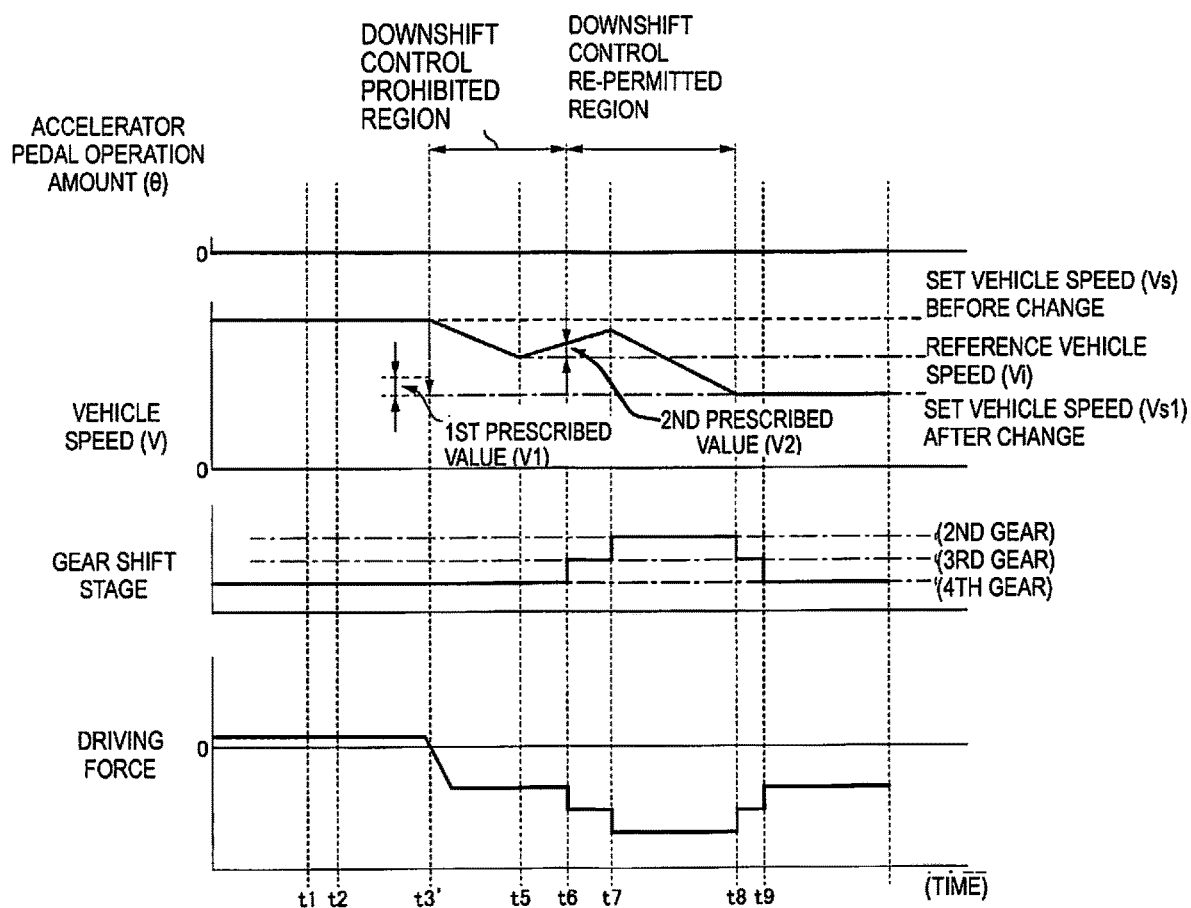
FIG. 5 is a timing chart illustrating one example of the vehicle travel control device according to the second embodiment during execution of the control process.

FIG. 4 is a flowchart illustrating the flow of a control process of the vehicle travel control device according to a second embodiment, and FIG. 5 is a timing chart illustrating one example of the vehicle travel control device according to the second embodiment during execution of the control process.

Since this embodiment is basically the same as the first embodiment, only the differences will be described.

In the first embodiment, in Step S3 of the flow chart of FIG. 2, it is determined whether the driver is operating the accelerator pedal 7a, but in the second embodiment, it is instead determined whether the driver has operated a constant speed travel control switch (operating element) to change the set vehicle speed Vs to a lower vehicle speed, as Step S13 of FIG. 4.

In addition, in the first embodiment, the downshift control prohibited region starts at time t2, when the vehicle speed V exceeds the set vehicle speed Vs by the first prescribed value V1 or more after the driver's operation of the accelerator pedal in the timing chart of FIG. 3, but in the second embodiment, the downshift control prohibited region starts at time t3' in the timing chart of FIG. 5, when the driver operates the constant speed travel control switch 8 to change the set vehicle speed Vs to a lower set vehicle speed Vs1, since the vehicle speed V exceeds the set vehicle speed Vs1 after the change by the first prescribed value V1 or more.

In addition, the engine 2 begins to generate a negative driving force. That is, the state is such that not-shown drive wheels are driving the engine 2 via the automatic transmission 3 and the torque converter 4.

Except for foregoing, this embodiment is the same as the first embodiment, so that the same parts are assigned the same reference numerals, and their descriptions are omitted. Thus, in the second embodiment, the same action and effects pertaining to the first embodiment can be exhibited.

Other Embodiments

Embodiments for implementing the present invention were described based on the embodiments, but specific configurations of the present invention are not limited by the configurations shown in the embodiments, and modifications that can be made without departing from the scope of the invention are also included in the present invention.

What is claimed is:

1. A vehicle travel control method using an electronic controller carries out a downshift control of an automatic transmission when a vehicle speed increases from a set vehicle speed during a constant speed travel control by at least a first prescribed value, the vehicle travel control method comprising:
   detecting a vehicle speed of a vehicle using a vehicle speed sensor;
   prohibiting a downshift control of the automatic transmission by the electronic controller upon determining the vehicle speed has increased from the set vehicle speed by at least the first prescribed value due to an operation of an operating element by a driver during the constant speed travel control; and
   executing the downshift control of the automatic transmission by the electronic controller upon determining insufficient deceleration of the vehicle exists where the driver is not operating an accelerator pedal during the prohibiting of the downshift control,
   the insufficient deceleration of the vehicle being determined to exist when the vehicle speed increases from a reference vehicle speed by at least a second prescribed value where the reference vehicle speed is set to a lowest vehicle speed following a completion of the driver's operation.

2. The vehicle travel control method according to claim 1, wherein
   the operation of the operating element is the operation of the accelerator pedal.

3. The vehicle travel control method according to claim 1, wherein
   the operation of the operating element is an operation to change the set vehicle speed to a lower vehicle speed by using a constant speed travel control switch.

4. A vehicle travel control device comprising:
   a vehicle speed sensor configured to detect a vehicle speed of a vehicle equipped with the vehicle travel control device; and
   at least one electronic controller including
      a constant speed travel control unit configured to execute a constant speed travel control;
      a downshift control unit configured to execute a downshift control of an automatic transmission upon determining a vehicle speed detected by the vehicle speed sensor increases from a set vehicle speed during the constant speed travel control of the constant speed travel control unit by at least a first prescribed value,
      a downshift prohibition control unit configured to prohibit a downshift control of the automatic transmission upon determining the vehicle speed has increased from the set vehicle speed by at least the first prescribed value due to an operation of an operating element by a driver during the constant speed travel control, and
      a re-downshift control unit configured to execute the downshift control of the automatic transmission upon determining an insufficient deceleration of the vehicle exists where the driver is not operating an accelerator pedal during the prohibiting of the downshift control by the downshift prohibition control unit,
   the insufficient deceleration of the vehicle being determined to exist when the vehicle speed increases from a reference vehicle speed by at least a second prescribed value where the reference vehicle speed is set to a lowest vehicle speed following a completion of the driver's operation.

* * * * *